United States Patent [19]

Bricker

[11] Patent Number: 4,960,574

[45] Date of Patent: Oct. 2, 1990

[54] PALLADIUM CONTAINING CATALYST FOR TREATMENT OF AUTOMOTIVE EXHAUST

[75] Inventor: Maureen L. Bricker, Buffalo Grove, Ill.

[73] Assignee: Allied-Signal Inc., Morris Township, Morris County, N.J.

[21] Appl. No.: 384,344

[22] Filed: Jul. 25, 1989

Related U.S. Application Data

[62] Division of Ser. No. 197,728, May 23, 1988, Pat. No. 4,868,149.

[51] Int. Cl.$^5$ ............................................. B01D 53/36
[52] U.S. Cl. .................................................. 423/213.5
[58] Field of Search ...................... 423/213.5; 502/303

[56] References Cited

U.S. PATENT DOCUMENTS 4,791,091 12/1988 Bricker et al. .................. 423/213.5
4,868,149 9/1989 Bricker et al. .................. 423/213.5

*Primary Examiner*—Jeffrey E. Russel
*Attorney, Agent, or Firm*—Frank S. Molinaro; Harold N. Wells; Roger H. Criss

[57] ABSTRACT

This application relates to a catalyst for treating automotive exhaust. The catalyst comprises a honeycomb carrier having deposited thereon a layer of alumina which has dispersed thereon lanthanum oxide, cerium oxide, palladium oxide and rhodium metal. The lanthanum oxide is present as crystallites that are less than about 25 Angstroms in size. The cerium oxide contains 3% lanthanum in the cerium oxide crystal lattice and the palladium oxide is present as crystallites which are less than about 20 Angstroms in size. A method of manufacturing the catalyst and process for using the catalyst are also disclosed and claimed.

7 Claims, No Drawings

PALLADIUM CONTAINING CATALYST FOR TREATMENT OF AUTOMOTIVE EXHAUST

This application is a division, of application Ser. No. 07/197,728, filed 5/23/88, now U.S. Pat. No. 4,868,149.

BACKGROUND OF THE INVENTION

Catalysts which can be used for treating automotive exhaust are well known in the art. More specifically, these catalysts contain platinum and/or palladium and usually rhodium and are known as three-way catalysts (TWC). Stabilizers and promoters have also been used to improve the activity of these catalysts. For example, U.S. Pat. No. 4,528,279 describes the use of cerium/lanthanum promoters in conjunction with noble metals such as platinum and rhodium as the active phase of the catalyst. The purpose of adding promoters such as cerium or lanthanum is to improve the durability of the three component control catalysts after prolonged use on a vehicle. U.S. Pat. No. 4,591,580 teaches the use of a catalytic composite containing lanthanum oxide, cerium oxide and an alkali metal oxide.

It is well established that Pt/Rh catalysts are better at treating automotive exhaust than Pd/Rh catalysts. For example, Adams and Gandhi have reported that platinum oxidizes saturated hydrocarbons better than palladium and thus a platinum-containing catalyst is the only practical catalyst for automotive applications. K. M. Adams and H. S. Gandhi, Ind. Eng. Chem. Prod. Res. Dev., 22, 207–212 (1983). Further, the prior art shows that virtually all commercial automotive catalysts contain Pt and Rh. See C. H. Wu and R. H. Hammerle, Ind. Eng. Chem. Prod. Res. Dev., 22, 559–565 (1983); and H. Muraki et al., "Palladium-Lanthanum Catalysts for Automotive Emission Control". Ind. Eng. Chem. Prod. Res. Dev., 25, 202–208 (1986). Because of the price and availability of Pt versus Pd, it would be very desirable to use Pd instead of Pt in TWC. Additionally, Pd is domestically available whereas Pt is mostly available from politically volatile countries. Therefore, there is a pressing need for a Pd/Rh catalyst with equivalent performance to a Pt/Rh catalyst.

Applicant has discovered a catalyst formulation containing palladium and rhodium as the catalytic elements which has at least comparable activity to a platinum and rhodium containing catalyst. The Pd/Rh-containing catalyst has comparable or better activity not only in the fresh state, but after extensive thermal durability testing. The most pronounced improvement is in hydrocarbon and nitric oxide activity. These results have not previously been observed. The substantial increase in activity of the catalyst of this invention can result in substantial economic savings to automobile manufacturers since the platinum which costs about $600/troy ounce can be replaced by palladium which costs about $150/troy ounce.

In addition to Pt and Rh, the catalyst of the present invention also contains lanthanum oxide and cerium oxide all dispersed on an alumina support which in turn is deposited on a honeycomb monolithic carrier. The instant catalyst is characterized in that: (1) the cerium oxide has incorporated in its crystal lattice at least 3% of the lanthanum; (2) the lanthanum oxide is present as crystallites which are smaller than 25 Angstroms; and (3) the palladium is present as palladium oxide crystals which are smaller than about 25 Angstroms. It is believed that it is the combination of these three factors which has resulted in the observed substantial increase in activity.

In comparing the instant catalyst to catalysts of the prior art, it is noted that there is no mention of a Pd/Rh catalyst characterized in the manner of the instant invention. Also, there is no mention that a Pd/Rh catalyst may be made equivalent to a Pt/Rh catalyst by the addition of lanthanum in the controlled way disclosed by applicant. Therefore, applicant has discovered a novel catalyst which fills a long-felt need in the art.

SUMMARY OF THE INVENTION

This invention relates to a thermally durable catalyst and to a method of manufacturing the catalyst which is used to treat an exhaust gas from an internal combustion engine (automotive exhaust). The catalyst comprises a metallic or ceramic honeycomb carrier having deposited thereon a layer of a high surface area alumina, the alumina having dispersed thereon lanthanum oxide present as crystallites of less than about 25 Angstroms, cerium oxide characterized in that at least 3% of the cerium in the cerium oxide crystal lattice is replaced by lanthanum oxide, palladium in the form of crystallites less than about 25 Angstroms in size and rhodium oxide.

Accordingly, one specific embodiment of the invention is a ceramic honeycomb support coated with alumina, the alumina having a surface area of about 180 $m^2/g$. The alumina has dispersed thereon lanthanum oxide, cerium oxide in which 3% of the lanthanum is incorporated in the cerium oxide crystal lattice, palladium oxide present as crystallites of less than 25 Angstroms and rhodium oxide.

Another embodiment of this invention is a method of manufacturing a catalyst comprising:

(a) coating a metallic or ceramic honeycomb carrier with a slurry of a high surface area alumina having dispersed thereon cerium oxide and calcining to give a first coated honeycomb carrier;

(b) impregnating the calcined first coated honeycomb carrier with a solution of a lanthanum salt, and calcining to give a calcined second coated honeycomb carrier; and (c) impregnating the calcined second coated honeycomb carrier with a solution containing a palladium and a rhodium compound, and calcining to give a finished catalyst, and recovering the finished catalyst.

Yet another embodiment of this invention is a method of treating an automotive exhaust comprising contacting the exhaust with the catalyst described above.

Other objects and embodiments will become more apparent after a more detailed description of the invention.

DETAILED DESCRIPTION OF THE INVENTION

As heretofore indicated, the present invention relates to a catalyst, a method of manufacturing this catalyst, and a process for treating automotive exhaust using this catalyst. A first necessary feature of this invention is a monolithic carrier material on which is deposited an alumina layer, which has dispersed thereon lanthanum oxide, cerium oxide, palladium oxide and rhodium. It is desirable that the carrier material be unreactive with the catalytic composite and not be degraded by the gas to which it is exposed. Ceramic and metallic materials are preferred classes of carrier materials. Examples of suitable ceramic materials include sillimanite, petalite, cordierite, mullite, zircon, zircon mullite, spodumene, alumina-titanate, etc. Additionally, metallic materials which are within the scope of this invention include metals and alloys as disclosed in U.S. Pat. No. 3,920,583 which are oxidation resistant and are otherwise capable of withstanding high temperatures.

The carrier material can best be utilized in any rigid unitary configuration which provides a plurality of pores or channels extending in the direction of gas flow. It is preferred that the configuration be a honeycomb configuration. The honeycomb structure can be used advantageously in either unitary form, or as an arrangement of multiple modules. The honeycomb structure is usually oriented such that gas flow is generally in the same direction as the cells or channels of the honeycomb structure. For a more detailed discussion of monolithic structures, refer to U.S. Pat. No. 3,785,998 and U.S. Pat. No. 3,767,453

A second necessary feature of the catalyst of this invention is a high surface area alumina. It is desirable that the alumina be a gamma alumina with a surface area of about 75 to about 200 $m^2/g$ and preferably a surface area of about 100 to about 180 $m^2/g$. It is also desirable that this alumina have a total pore volume from about 0.25 to about 0.80 $cm^3/g$ and more preferably from about 0.45 to about 0.65 $cm^3/g$. The carrier material may be coated with this alumina in a variety of ways as will be enumerated herein.

A third necessary feature of the catalyst of this invention is lanthanum oxide. The lanthanum oxide may be dispersed on the alumina in a number of ways which will be shown herein. The lanthanum oxide is present on the alumina in the form of crystallites having an average size of less than about 25 Angstroms. The size of the lanthanum oxide crystallites was arrived at in two ways. First, x-ray diffraction analysis of fresh samples of catalysts prepared according to this invention could not detect lanthanum oxide or any other lanthanum species. Since the smallest crystallites which can be detected by x-ray diffraction is 40 Angstroms, then the lanthanum oxide is present as crystallites which have an average size of less than 40 Angstroms. Further, catalyst samples prepared according to this invention were durability tested and then analyzed by STEM. Again no individual crystallites or clusters could be detected. Since the detection limit of the STEM is about 25 Angstroms, this means that the lanthanum oxide is present as crystallites which are smaller than about 25 Angstroms. The lanthanum oxide may be dispersed on the alumina by means such as impregnation of the alumina with a lanthanum compound or other well known means as will be described more fully herein.

Another essential feature of this catalyst is cerium oxide which is dispersed on the alumina. The cerium oxide is dispersed on the alumina in a number of ways which will be shown herein. The important feature of this cerium oxide is that its crystal lattice has been altered by replacing 3% of the cerium atoms in the lattice with lanthanum atoms. The presence of the lanthanum in the cerium oxide lattice inhibits the crystallite growth during exposure to engine exhaust at a temperature of about 850° C. and during heating in air and water (90% air/10% water) at a temperature of about 1000° C. Various methods of dispersing the cerium oxide on the alumina will be exemplified herein.

The final essential feature of this catalyst is the presence of palladium oxide and rhodium oxide. The palladium oxide is present as crystallites which are smaller than about 25 Angstroms. Catalysts of this invention were analyzed by a scanning transmission electron microscope (STEM) which did not reveal any palladium oxide crystallites. Since the detection limit of the STEM is about 25 Angstroms, the palladium oxide crystallites must be smaller than about 25 Angstroms. The palladium oxide and rhodium oxide may be dispersed in a number of ways as will be described in detail.

Another embodiment of this invention is a method of manufacturing the catalyst. The first step of this method consists of coating a metallic or ceramic honeycomb carrier with a slurry of a high surface area alumina having dispersed thereon cerium oxide. The cerium oxide may be dispersed on the alumina in a number of ways known in the art. For example, the alumina may be impregnated with an aqueous solution of a cerium compound, and calcined (heated in air) at a temperature of about 400° to about 700° C. for a time of about one to about three hours. This results in the formation of well dispersed cerium oxide on the alumina. The only criteria used to select the cerium compound are that the compound be soluble in water and that the compound decompose to cerium oxide upon calcination. Examples of such compounds are cerium chloride, cerium acetate, cerium nitrate, etc.

Other methods of dispersing cerium oxide onto the alumina include coprecipitating or cogelling a cerium compound with an aluminum compound and then heating in air at a temperature of about 400° to about 700° C. to give a high surface area alumina having cerium oxide dispersed thereon. It is desirable that the amount of cerium oxide present on the alumina be from about 5 to about 50 weight percent of the alumina and preferably from about 15 to about 35 weight percent.

Regardless of how the cerium oxide is dispersed on the alumina, a slurry is prepared using this alumina containing cerium oxide (hereinafter referred to as stabilized alumina). The slurry can be prepared by means known in the art such as combining the appropriate amounts of the stabilized alumina with an aqueous solution of an acid such as nitric, hydrochloric, sulfuric acid, etc. The resultant slurry is ball milled for about 2 to 6 hours to form a usable slurry. Other types of mills such as impact mills can be used to reduce the milling time to about 5 to 30 minutes.

This slurry can now be used to deposit a thin film or coating onto the monolithic honeycomb carrier by means well known in the art. One such method involves dipping the monolithic carrier into said slurry, blowing out the excess slurry, drying and calcining in air at a temperature of about 500 to about 700° C. for about 1 to about 4 hours. This procedure can be repeated as many times as necessary until the desired amount of alumina on the monolithic honeycomb carrier is achieved. It is desirable that the alumina be present on the monolithic honeycomb carrier in amounts in the range from about 90 g to about 170 g of alumina per liter of carrier volume, where the volume is measured by the exterior dimensions of the monolithic honeycomb carrier structure.

The next step in the preferred method of manufacturing is to impregnate the honeycomb carrier which has deposited thereon a layer of stabilized alumina, with an aqueous solution of a lanthanum compound. Any water soluble and decomposable lanthanum compound may be used. Illustrative of these compounds are lanthanum chloride, lanthanum nitrate and lanthanum acetate. The actual impregnation may be effected by means known in the art such as dipping the honeycomb carrier into the lanthanum compound solution or spraying the solution onto the monolithic honeycomb carrier. Regardless of the physical process used to impregnate the lanthanum compound, the impregnated honeycomb carrier is calcined at a temperature of about 500° to about 700° C. for a time of about 1 to about 4 hours, thereby converting the lanthanum compound to lanthanum oxide.

It is important to note that all of the lanthanum compound is not converted to lanthanum oxide. A portion of the lanthanum compound is impregnated onto the cerium oxide particles. During heating, this portion of the lanthanum compound decomposes and migrates into the cerium oxide crystal lattice. It is desirable that the cerium oxide contain at least 3% lanthanum. That is, 3% of the cerium atoms are replaced by lanthanum atoms.

It has been determined that incorporating lanthanum into the cerium oxide crystal lattice stabilizes the cerium oxide toward undesirable growth when the catalyst is exposed to high temperature (above 800° C.) during use. The lanthanum oxide also has a stabilization effect on the palladium oxide and rhodium oxide, especially on the palladium oxide. For example, during fuel rich excursions, the palladium oxide is converted to palladium metal which at high temperatures can grow into large crystallites. X-ray diffraction analysis of durability tested catalysts shows that the lanthanum oxide prevents the growth of palladium into large crystallites. Further, it also appears that the lanthanum oxide may prevent or minimize the formation of rhodium aluminate which is inactive for treating automotive exhaust. Thus, lanthanum oxide keeps rhodium in an active state.

Finally, it is desirable that the lanthanum oxide be present on the honeycomb carrier in an amount from about 3 to about 22 weight percent of the alumina, and preferably from about 5 to about 15 weight percent. This amount includes the lanthanum incorporated into the cerium lattice expressed as lanthanum oxide.

The final step in this preferred method of preparation is to disperse palladium oxide and rhodium oxide onto the coated honeycomb carrier. One method of dispersing palladium oxide and rhodium oxide onto the support is to impregnate the coated honeycomb carrier with an aqueous solution containing a palladium and rhodium compound. The only criteria required of these compounds is that they be soluble in water and decompose when heated in air. Under the conditions employed in this process, both the palladium compound and the rhodium compound decompose to the oxide. Illustrative of these compounds are rhodium trichloride, hexaamminerhodium chloride, rhodium carbonylchloride, rhodium trichloride hydrate, rhodium nitrate, sodium hexachlororhodate, sodium hexanitrorhodate, chloropalladic acid, palladium chloride, palladium nitrate, diamminepalladium hydroxide, tetraamminepalladium chloride. Of these compounds rhodium chloride and chloropalladic acid are preferred.

The physical process of impregnating these compounds is as described for the lanthanum compound. After the impregnation, the impregnated honeycomb carrier is calcined at a temperature of about 400° to about 500° C. for a time of about 1 to about 4 hours, thereby decomposing the compounds. It is desirable that the palladium oxide be present in an amount from about 0.1 to about 9 weight percent of the alumina and preferably from about 0.2 to about 2 weight percent.

Similarly, it is desirable that the rhodium be present in an amount from 0.01 to about 4 weight percent of alumina and preferably from about 0.04 to about 1.0 weight percent.

It is not necessary that the palladium compound and rhodium compound be impregnated together. The compounds can be impregnated separately in any order. Alternatively, the palladium and rhodium compounds may be combined with the lanthanum compounds in one solution and then impregnated onto the coated honeycomb carrier. Another method of dispersing the palladium oxide, rhodium oxide and lanthanum oxide is to impregnate the stabilized alumina with a solution containing compounds of each metal prior to depositing the stabilized alumina onto the honeycomb carrier. Of course the three metals may be individually impregnated onto the stabilized alumina in any sequence. Although all these methods may be used, the resultant catalysts may not be equivalent.

The palladium oxide present on the catalyst is characterized as being in the form of crystallites less than 25 Angstroms. As mentioned above, catalysts prepared according to this invention were analyzed by STEM. No crystallites were observed by this technique, thereby indicating that the palladium oxide is present as crystallites smaller than about 25 Angstroms since that is the detection limit of the STEM.

It should be reemphasized that it is the combination of: (1) small palladium oxide crystallites; (2) small lanthanum oxide crystallites, and (3) the inclusion of lanthanum into the cerium oxide lattice which results in the observed substantial increase in activity. Again, a Pd/Rh-containing catalyst which has at least equivalent activity to a Pt/Rh-containing catalyst has previously not been reported. It is applicant who has discovered such a catalyst, for which there is a pressing need in the art.

The catalyst of this invention has a further advantage in that it exhibits improved thermal stability over catalysts of the prior art. This improvement was verified by a long term durability study. In this study, the catalyst of the instant invention was placed on an engine along with a comparison catalyst and exposed to the exhaust from the engine for 100 hours. The peak temperature of the exhaust was about 750° C. The results of this test showed that the catalyst of the present invention has better activity than either a Pt/Rh containing catalyst or a Pd/Rh/Ce containing catalyst. Additionally, x-ray analysis of these catalysts showed that the palladium crystallite size was substantially smaller (about 200 to about 400 Angstroms) for the catalyst of the present invention than for the Pd/Rh/Ce catalyst (about 750 to about 1000 Angstroms). This indicates that the palladium metal in the catalyst of the present invention has undergone less sintering than the palladium metal of the Pd/Rh/Ce catalyst.

It is yet another embodiment of the instant invention to provide a process for the treatment of exhaust gases, especially exhaust gases from an internal combustion engine, which comprises contacting said gases with the catalytic composite described herein.

In order to more fully illustrate the advantages to be derived from the instant invention, the following examples are set forth. It is to be understood that the examples are only by way of illustration and are not intended as an undue limitation on the broad scope of the invention as set forth in the appended claims.

EXAMPLE I

A catalyst according to the instant invention was prepared as follows. In a beaker, 5000 grams of pseudoboehmite alumina and 13,562 grams of a solution of cerium acetate (7 weight percent cerium) were mixed, stirred for 30 minutes, transferred to a shallow tray, dried for 4 hours at 150° C. and finally calcined at 600° C. for 1 hour. The calcined alumina/cerium oxide powder was next stirred into a container which contained 5.33 liters of water and 48 mL of concentrated nitric acid ($HNO_3$). This mixture was ball milled for 4 hours.

An oval shaped cordierite monolith with a minor axis of 8 cm, a major axis of 14.3 cm, a length of 12 cm and having 400 square channels per square inch of facial area was dipped into the above-described slurry. After dipping, the excess slurry was blown out with an air gun. The slurry coated monolith was calcined for about 1 hour at 540° C. The above-described dipping, blow-out and calcining steps were repeated until the honeycomb carrier contained 152 g of coating per liter of monolith volume.

Next, the coated honeycomb was dipped into a container containing 2 L of an aqueous solution containing 760 g of lanthanum nitrate ($La(NO_3)_3.6H_2O$). After dipping, the impregnated monolith was dried and heated in air for about one hour at 540° C.

Finally, the palladium oxide and rhodium were dispersed as follows. The above-described honeycomb carrier was dipped for 4 minutes into a 2 L aqueous solution containing 17.6 g of chloropalladic acid and 1.85 g of rhodium chloride. After dipping, the impregnated honeycomb carrier was dried and heated in air for about one hour at 540° C. This catalyst was designated catalyst A The analyzed composition of catalyst A in units of g/liter was Pd=1.29, Rh=0.06, Ce=22.2, and La=13.9.

X-ray analysis of a portion of this catalyst showed that the cerium oxide crystal lattice contained 3% lanthanum.

EXAMPLE II

A commercial reference catalyst containing platinum and rhodium was prepared in a similar manner to the procedure of Example I except that there was no lanthanum present in this formulation, but barium was present. Platinum and rhodium were dispersed onto the coated honeycomb carrier by dipping the carrier into a 2 L aqueous solution containing 17.6 g of chloroplatinic acid and 1.85 g of rhodium chloride. The coated honeycomb carrier was maintained in contact with the solution for about 4 minutes. After dipping, the impregnated honeycomb carrier was dried and heated in air for about one hour at 540° C. The catalyst was designated catalyst B. The platinum was analyzed to be present in a concentration of 1.3 g/l and rhodium was analyzed to be 0.06 g/l.

EXAMPLE III

A second reference catalyst containing palladium and rhodium was prepared in a similar manner to that of Example I except that there was no lanthanum present, but barium was present. Analysis of this catalyst showed that the palladium content was 1.28 g/l and the rhodium content was 0.07 g/l. This catalyst was designated catalyst C.

EXAMPLE IV

A sample of catalysts A, B and C was cut into quarters by making a cut across the face of the honeycomb and extending the cut down the length of the honeycomb. Each half was again cut down the length of the honeycomb, thereby giving a quarter of a honeycomb. One quarter of samples A, B and C and a fourth sample were cemented together to form a whole honeycomb carrier. The amount of coating on all four samples was equivalent so that the exhaust flow through each quarter piece was the same. This composite honeycomb was mounted in a special converter and placed in the exhaust stream of one bank of a V-8 gasoline fueled engine. Another converter was placed in the exhaust stream of the other bank of the V-8 engine.

The engine on which the catalysts were mounted was a Ford 5.0 L V-8 engine equipped with dual throttle body fuel injectors and was operated according to the following cycle. The durability cycle consisted of a 60 second cruise mode and a 5 second fuel cut mode. During the cruise mode, the engine operated at stoichiometry while during the fuel cut mode, the engine operated at a fuel lean condition that included a temperature and an oxygen spike. The fuel cut mode is achieved by breaking the circuit between one of the fuel injectors and the Electronic Engine Control. The engine speed and load on the engine was adjusted to give an exhaust gas temperature at 750° C. during the cruise mode and 704° C. during the fuel cut mode. This cycle was repeated for 100 hours.

EXAMPLE V

After Catalysts A, B and C were durability tested according to Example IV, they were evaluated as follows. The evaluation test was performed using an engine dynamometer which measures the performance of the catalyst (hydrocarbon, carbon monoxide, and nitric oxide) as a function of air/fuel ((A/F). The test involved evaluating the catalyst at seven different A/F ratio points (14.80, 14.65, 14.55, 14.45, 14.35, 14.20 and 14.10) at an inlet temperature of 450° C. At each A/F point, the air/fuel was oscillated plus or minus 0.1 A/F at one Hertz frequency. Conversions of hydrocarbon, carbon monoxide and nitric oxides were calculated at each A/F and then an integral performance conversion was obtained by averaging the conversions between an A/F at 14.41 to 14.71.

The results of this evaluation are presented in Table 1.

TABLE 1

| Catalyst | Effect of Lanthanum on Catalyst Performance | | |
|---|---|---|---|
| | Integral Conversion (%) | | |
| | HC | CO | $NO_x$ |
| A(Pd/Rh/La) | 88 | 60 | 68 |
| B(Pt/Rh) | 84 | 62 | 65 |
| C(Pd/Rh) | 81 | 59 | 63 |

The data in Table 1 clearly show that when lanthanum is added to a palladium plus rhodium catalyst (Catalyst A), that catalyst has better activity (hydrocarbon and nitric oxide) than a catalyst without lanthanum (Catalyst C). Additionally, the palladium/rhodium plus lanthanum catalyst (Catalyst A) has improved activity over a platinum plus rhodium catalyst (Catalyst B). This effect has not been observed for durability tested catalysts. Thus, catalyst A (the catalyst of this invention)

shows surprising results and represents a significant advance in the art of automotive catalysts.

EXAMPLE VI

Catalysts A, B and C from Example V were also evaluated as follows. The evaluation test was a continuous temperature traverse test at an A/F ratio of approximately 14.55. During this test the temperature of the exhaust gas going into the converter was continuously varied from 200° C. to 460° C. by varying the heat transfer rate of a stainless steel heat exchanger. Conversion of hydrocarbon, carbon monoxide and nitric oxides were calculated as a function of temperature. The temperature required to reach 25% and 50% conversion is a common criterion used to evaluate catalysts (referred to as light-off performance). The results of these evaluations are presented in Table 2.

TABLE 2

Effect of Lanthanum on Light-Off Performance

| Catalyst | *T-25% | | | *T-50% | | |
|---|---|---|---|---|---|---|
| | HC | CO | NO$_x$ | HC | CO | NO$_x$ |
| A (Pd/Rh/Ce/La) | 373 | 376 | 372 | 388 | 394 | 389 |
| B (Pt/Rh/Ce) | 388 | 386 | 374 | 399 | 399 | 390 |
| C (Pd/Rh/Ce) | 387 | 390 | 388 | 400 | 408 | 401 |

*Temperature (°C.) required to reach stated conversion.

The results in Table 2 show that a Pd/Rh containing catalyst (Catalyst C) does not have as good light-off performance as a Pt/Rh catalyst (Catalyst B) after 100 hours of durability testing. However, when lanthanum is added to the formulation, the resultant Pd/Rh plus lanthanum catalyst (Catalyst A) now has better light-off performance than the Pt/Rh containing catalyst (Catalyst B). Again this advantage has not previously been observed.

EXAMPLE VII

Samples of Catalysts A, B and C were analyzed by x-ray diffraction and the results are presented in Table 3.

TABLE 3

Comparison of Noble Metal Crystallite Size

| Catalyst | Crystallite Size (Angstroms) | | |
|---|---|---|---|
| | Pd | Pt | CeO$_2$ |
| A (Pd/Rh/Ce/La) | 200–400 | — | 90–100 |
| B (Pt/Rh/Ce) | — | 200–300 | 150–170 |
| C (Pd/Rh/Ce) | 750–100 | — | 150–170 |

The data in Table 3 show that the presence of lanthanum stabilizes both the palladium and the cerium oxide crystallite size. This data show the improved thermal durability of the instant catalyst.

I claim as my invention:

1. A method of treating an automotive exhaust comprising contacting the exhaust with a catalyst comprising a metallic or ceramic honeycomb carrier having deposited thereon a layer of an alumina with a surface area from about 75 to about 200 m$^2$/g, the alumina having dispersed thereon lanthanum oxide present as crystallites of less than about 25 Angstroms, cerium oxide, the cerium oxide characterized in that at least 3% of the cerium in the cerium oxide crystal lattice is replaced by lanthanum, palladium oxide in the form of crystallites less than about 25 Angstroms in size and rhodium oxide.

2. The method of claim 1 where the alumina has a pore volume from about 0.25 to about 0.8 cm$^3$/g.

3. The method of claim 1 where the alumina is present in an amount from about 90 to about 170 g of alumina per liter of volume of carrier.

4. The method of claim 1 where the cerium oxide is present in an amount from about 5 to about 50 weight percent of the alumina.

5. The method of claim 1 where the lanthanum oxide is present in an amount from about 3 to about 22 weight percent of the alumina.

6. The method of claim 1 where the palladium oxide is present in an amount from about 0.1 to about 9 weight percent of the alumina.

7. The method of claim 1 where the rhodium is present in an amount from about 0.01 to about 4 weight percent of the alumina.

* * * * *